(12) United States Patent
Dalcher et al.

(10) Patent No.: US 7,716,686 B1
(45) Date of Patent: May 11, 2010

(54) SYSTEM, METHOD AND COMPUTER PROGRAM PRODUCT FOR INTERFACE HOOKING

(75) Inventors: Gregory William Dalcher, Tigard, OR (US); Scott Clementson Elliott, Hillsboro, OR (US); Joe C. Lowe, Aloha, OR (US)

(73) Assignee: McAfee, Inc., Santa Clara, CA (US)

( * ) Notice: Subject to any disclaimer, the term of this patent is extended or adjusted under 35 U.S.C. 154(b) by 1004 days.

(21) Appl. No.: 11/354,392

(22) Filed: Feb. 14, 2006

(51) Int. Cl.
 *G06F 3/00* (2006.01)
(52) U.S. Cl. ...................... 719/328; 719/331
(58) Field of Classification Search .............. 719/328, 719/330, 331
See application file for complete search history.

(56) References Cited
U.S. PATENT DOCUMENTS

| | | | | |
|---|---|---|---|---|
| 5,630,050 A | * | 5/1997 | Neuhard et al. ............... 714/27 |
| 5,822,749 A | * | 10/1998 | Agarwal ........................ 707/2 |
| 7,028,309 B2 | * | 4/2006 | Ward et al. ................... 719/328 |
| 7,100,123 B1 | * | 8/2006 | Todd et al. ................... 715/862 |
| H2202 H | * | 9/2007 | Conover et al. ............. 718/108 |
| 2004/0123279 A1 | * | 6/2004 | Boykin et al. ............... 717/158 |
| 2004/0163087 A1 | * | 8/2004 | Sandland et al. ............ 719/310 |
| 2007/0016914 A1 | * | 1/2007 | Yeap .......................... 719/328 |

OTHER PUBLICATIONS

"Hooks", MSDN Library, msdn.microsoft.com/library.
"Hooks", DrupalDocs, drupaldocs.org/api/head/group/hooks.
"McAfee® Host Intrusion Prevention version 6.0," 64.233.179.104/search?q=cache:gJ3UAOUYIzYJ:download.nai.com/products.

\* cited by examiner

*Primary Examiner*—Lechi Truong
(74) *Attorney, Agent, or Firm*—Zilka-Kotab, PC

(57) ABSTRACT

A system, method and computer program product are provided. In use, a holding instruction is inserted. After inserting the holding instruction, the hooking of an interface is completed.

16 Claims, 5 Drawing Sheets

SYSTEM, METHOD AND COMPUTER PROGRAM PRODUCT FOR INTERFACE HOOKING

FIELD OF THE INVENTION

The present invention relates to interfaces, and more particularly to hooking interfaces.

BACKGROUND

Hooking applications are becoming increasingly popular, especially in the security and network management arts. Such hooking applications are adapted for hooking various aspects of an interface. By way of example, some of such applications are capable of hooking application program interface (API) calls.

Such API hooking is a technique where an API is modified so that subsequent invocations of a particular function transfer control to a handler. This handler may then, in turn, analyze the original API invocation, report usage of the API, modify relevant parameters, etc. Further, in the case of security applications, API hooking may serve to enable a decision as to allowing or disallowing the original API to be invoked.

Unfortunately, the control transfer instruction most commonly used during hooking is longer than a number of bytes that can be written atomically (e.g. capable of being carried out without interference from other executed threads, etc.). Because of this, a danger exists for a race condition where the replacement of the original code of the API is in an incomplete state when another thread executes this portion of the original API code. If this occurs, the results may be unpredictable and the executing thread and process may crash which, in turn, may possibly crash the operating system as well.

Additionally, the control transfer instruction most commonly used during hooking can be longer than the instruction to be replaced, so that multiple smaller instructions might be overwritten. For example, the control transfer instruction in an arbitrary example may require five bytes, but the instruction to be replaced might be only four bytes in size. A typical hook mechanism might immediately replace all five bytes required by the control transfer instruction, which in this example would replace all four bytes of the first instruction and one byte of a second instruction. A danger exists that another thread might then attempt to execute the second instruction whose bytes have been partially or entirely replaced with the bytes of the control transfer instruction.

There is thus a need for overcoming these and/or other problems associated with the prior art.

SUMMARY

A system, method and computer program product are provided. In use, a holding instruction is inserted. After inserting the holding instruction, the hooking of an interface is completed.

DETAILED DESCRIPTION

Figure 1:
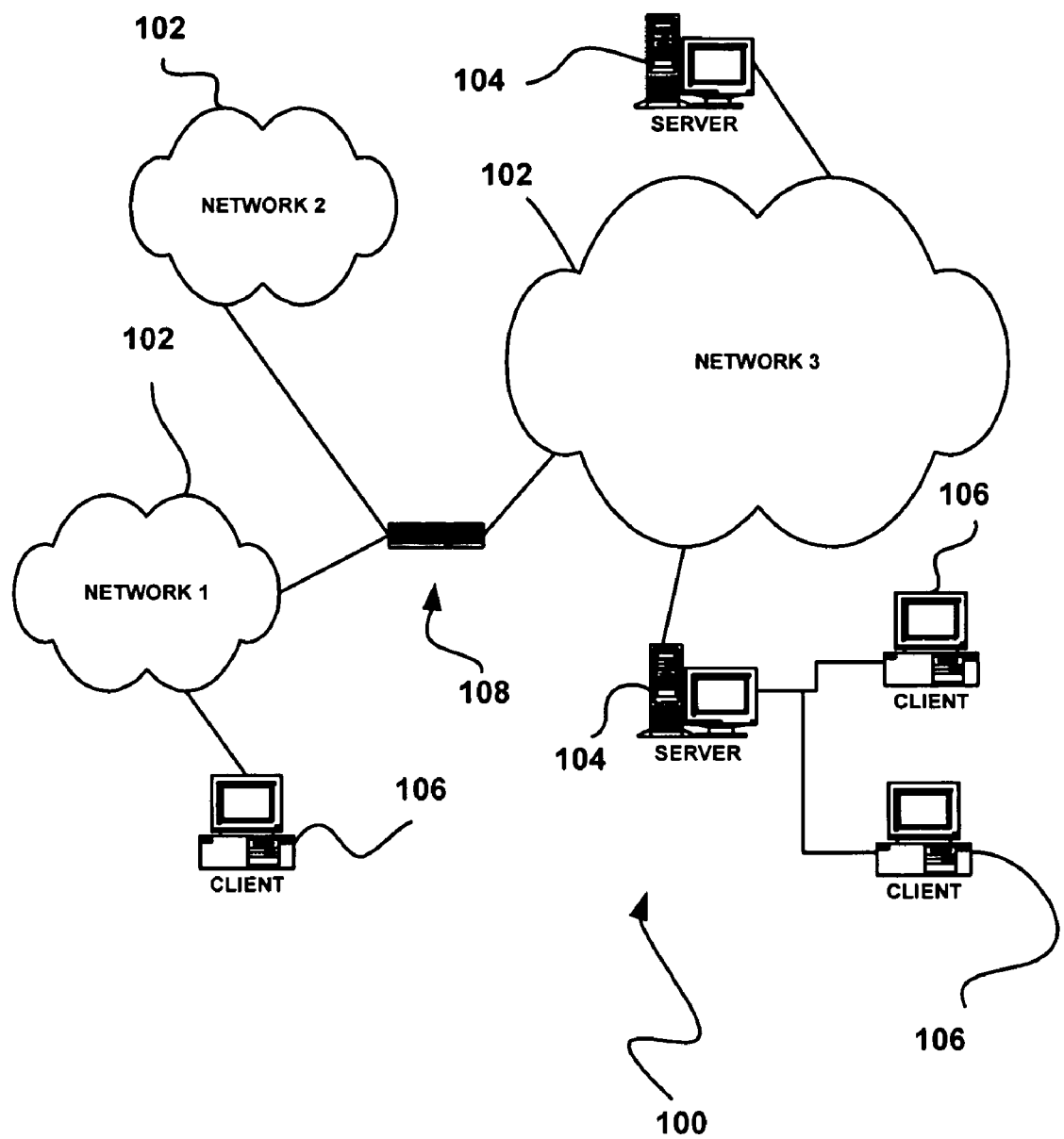
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

Figure 2:
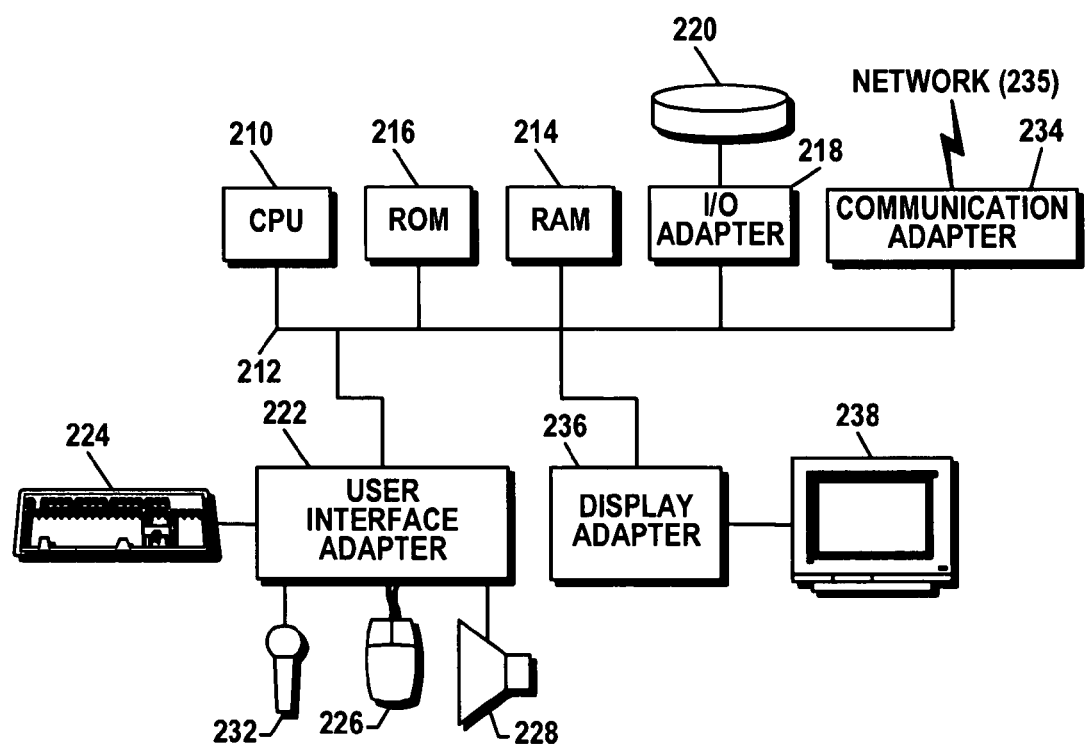
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
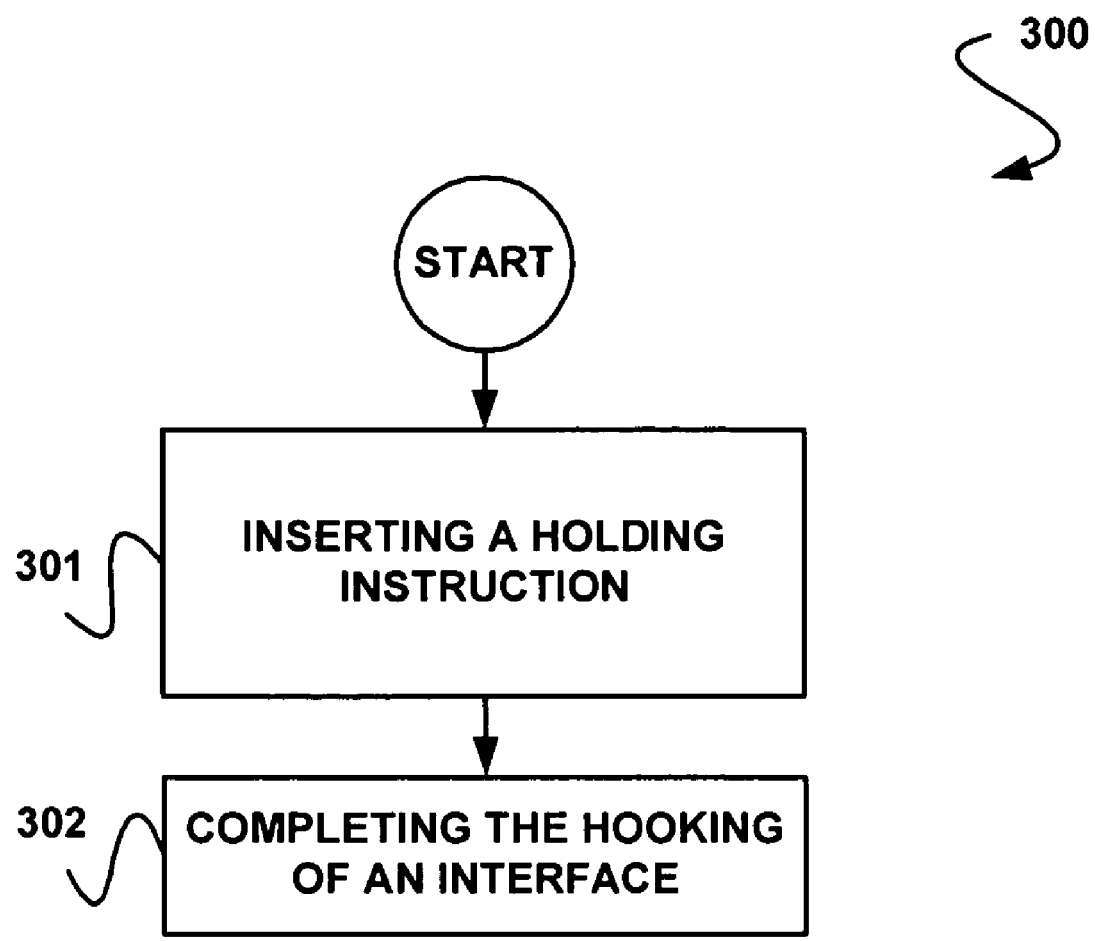
FIG. 3 shows a method for hooking an interface, in accordance with one embodiment.

FIG. 3 shows a method 300 for hooking an interface, in accordance with one embodiment. As an option, the method 300 may be implemented in the context of the architecture and environment of FIGS. 1 and/or 2. Of course, however, the method 300 may be carried out in any desired environment.

As shown, hooking begins in operation 301 by the insertion of a holding instruction. In the context of the present description, such hooking may refer to any technique where an interface (or component thereof) is modified, replaced, etc. so that subsequent invocations transfer control to different code, etc. In one embodiment, the interface may optionally include an application program interface (API). It should be further noted that the hooking may be performed for any desired purpose that is capable of being served by the aforementioned transfer of control. Just by way of example, the hooking may be carried out for security purposes. Specifically, in one embodiment, the hooking may be utilized to detect and/or prevent intrusions.

Further in the context of the present description, the holding instruction may include any instruction that holds operation of the interface. Specifically, in various embodiments, such hold may be carried out such that there is a delay before the aforementioned hooking (i.e. modification, replacement, etc.) is completed, for reasons that will soon become apparent.

For example, in one optional embodiment, the holding instruction may include a jump instruction and possibly a relative jump instruction. Such relevant jump instruction may operate to jump to a location of the jump instruction, thereby "spinning" the operation of the interface. Of course, any placeholder instruction may further be utilized for the foregoing holding purposes.

Still yet, for reasons that will soon become apparent, the holding instruction may, in another embodiment, may be inserted by way of an atomic operation. Such atomic operation refers to an operation that may be completed without being interfered with by another thread. To this end, the holding instruction may be inserted with the confidence that there will be no impact on other threads currently being executed, and vice-versa.

After inserting the holding instruction, the hooking of the interface is completed. See operation 302. In one embodiment, such completion may involve the complete modification, replacement, etc. of the interface such that subsequent invocations operate as intended to transfer control to different code, etc. By inserting the holding instruction prior to completing the hooking, any execution and/or thread that arrives at the holding instruction is held, so that the hooking may be completed without disruption.

Of course, the completion of the hooking may be accomplished in any desired manner. Just by way of example, completing the hooking may involve inserting a first portion of hook code after the inserted holding instruction. As will be discussed hereinafter in greater detail, this insertion may be performed after a yield operation, so that any of the to-be-replaced/modified original code may complete any already-started execution. Thus, various problems may be avoided including, but not limited to the disruption of the original code in the form of a race condition where a thread associated with the hooking interferes with that of the original code or vice-versa.

After the yield operation, the completion of the hooking may be concluded by replacing the holding instruction with a second portion of hook code. To this end, the second portion of hook code is inserted after the first portion of hook code, such that, together, the first and second portion of the hook code constitute an entirety of hook code to be inserted. In another embodiment, completing the hooking after the yield operation may involve rolling out the holding instruction, aborting the hooking.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described in and out of a security-related context.

Figure 4:
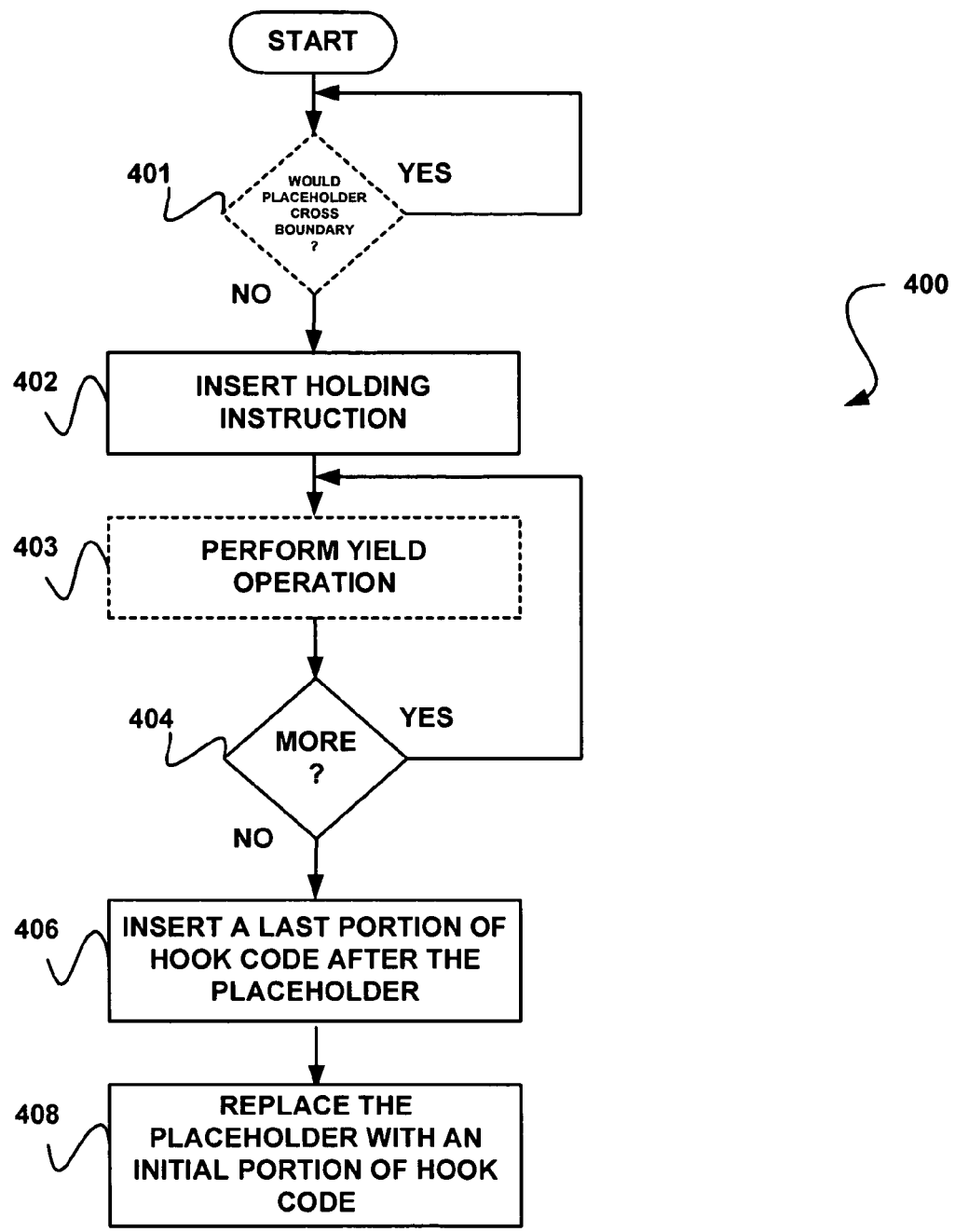
FIG. 4 shows a method for hooking an interface, in accordance with another embodiment.

FIG. 4 shows a method 400 for hooking an interface, in accordance with another embodiment. As an option, the method 400 may be implemented in the context of the architecture and environment of FIGS. 1-3. Of course, however, the method 400 may be used in any desired environment. Further, the aforementioned definitions may equally apply to the description below.

Skipping, for now, operation 401 (which will be described hereinafter in greater detail), the method 400 may begin with the insertion of a holding instruction. Note operation 402. As mentioned above, the holding instruction may include any instruction that holds operation of an interface (e.g. a relative jump instruction, etc.). Further, in the present embodiment, the holding instruction may be inserted in a location where the interface hook is to take place.

For the reasons set forth hereinabove, the holding instruction may be short enough to be able to be written with an atomic operation. In a very specific embodiment involving an x86 central processing unit (CPU), a 2 byte instruction may be used, for example. Thus, any thread reaching such holding instruction will being held at this point and not proceed, in order to avoid a race condition or the like.

Thereafter, in operation 403, a yield operation may optionally be performed. In one embodiment, such yield operation may be implemented with a sleep instruction (e.g. MICROSOFT SLEEP instruction, etc.). In use, such yield operation ensures that any of the original code to be replaced/modified by the hook code may be fully executed, prior to replacement/modification.

Depending on the implementation of a scheduling algorithm associated with an operating system, a single yield operation may be sufficient. However, in the case of some operating systems, scheduling optimizations may make using a single yield operation ineffective in accomplishing the goal of allowing other threads to complete their execution of the interface code to be modified. On such operating systems, performing a second yield operation (or more) may be useful. See decision 404.

Thus, in one embodiment, the yield operation permits the complete execution of any other threads executing the rest of the portion of the original interface code to be overwritten (beyond that replaced by the holding instruction). To accomplish this, the yield operation may ensure that the current thread, which is performing the interface hook, suspends its execution for a period of time.

After the yield operation(s) has been completed (and any other threads have been fully executed), a last portion of the final hooking code to be written may be inserted after the holding instruction. See operation 406. It should be noted that the holding instruction may still be in place at this point, in order to prevent a thread from executing any portion of code subsequent to the holding instruction, while the aforementioned writing of operation 406 is taking place.

Thereafter, the holding instruction may be replaced with the initial portion of the final hooking code to be written. See operation 408. Such replacement thus completes the writing of the hooking control transfer instruction(s) into code of the interface to be hooked. In this way, another thread may be able to safely begin/finish execution of the to-be-modified area, while the hooking code is only partially inserted.

With reference back to operation 401, it may be optionally determined whether the holding instruction would cross a memory boundary (e.g. a cache memory boundary, etc.), prior to inserting the same. By this feature, the holding instruction may be conditionally inserted based on the determination.

If the holding instruction crosses such a boundary, it is possible for caching of an adjacent page to lose the benefit of the atomic write operation, since, depending on the hardware architecture, memory controlling hardware may not ensure that a write across such a boundary is guaranteed safe for other threads executing code from that same region of memory.

To address this, in various embodiments, it may be determined, beforehand, if the holding instruction will cross such a memory boundary, per decision 401. If not, the method 400 may safely proceed, confident that the writing of the holding instruction will indeed be atomic.

In addition to being capable of being placed with an atomic memory write operation, the use of a short holding instruction greatly reduces a chance of such instruction crossing such a memory boundary.

On the other hand, if the holding instruction will cross a memory boundary, and this is a potential issue with the memory controlling hardware of the system, various options are available. For example, the interface hooking may simply not be completed, as shown in FIG. 4. In the alternative, the method 400 may simply ignore the potential for the hooking to be non-atomic, and nevertheless proceed until completion.

In yet another embodiment, a search may be conducted for a subsequent hook target point past the memory boundary. This search may include an analysis of any subsequent instructions, ensuring that there are no control transfer instructions or instructions affecting a stack or parameters passed to the original interface, between the original hook target point and the potential relocated one. If this criterion is met, the holding instruction may be conditionally inserted past the memory boundary based on the determination. Again, see decision 404.

It should be noted that, if such relocation technique is used, there is a potential for a hooking point to be executed due to control transferring to a point between it and the original hooking point. Depending on design goals, it may make sense to differentiate between such invocations.

FIGS. 5A, 5B, 5C, and 5D show code 500 that results from the various operations of method 400 of FIG. 4, in accordance with another embodiment. As an option, the code 500 may be implemented in the context of the architecture and environment of FIGS. 1-4. Of course, however, the code 500 may be used in any desired environment. Further, the aforementioned definitions may equally apply to the description below.

As shown, included is 1) interface code to be hooked 502, 2) a holding instruction 504, 3) an initial portion of hooking code 508, and 4) a last portion of hooking code 506.

Figure 5A:
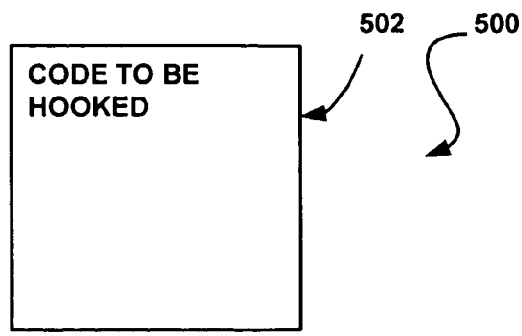
FIGS. 5A, 5B, 5C, and 5D show code that results from the various operations of the method of FIG. 4, in accordance with another embodiment.

Starting with FIG. 5A, the interface code to be hooked 502 is shown prior to any hooking taking place. Thus, the interface code to be hooked 502 exists prior to any of the operations of FIG. 4.

Figure 5B:
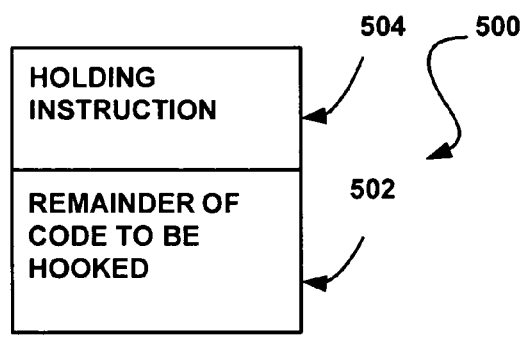

Moving on to FIG. 5B, the holding instruction 504 is inserted into the interface code to be hooked 502. It should be noted that the holding instruction 504 is not drawn to scale in the present figure, as it, in one embodiment, is constructed so that it may be inserted with an atomic operation. With respect to FIG. 4, the code 500 is a result of operation 402 thereof.

Figure 5C:
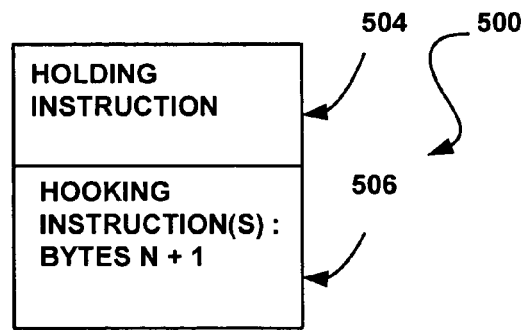

Still yet, in FIG. 5C, the last portion of hooking code 506 is shown to be inserted after the holding instruction 504. Such last portion of hooking code 506 is inserted after operations 402-403, to permit any outstanding threads to complete execution of the instructions being overwritten. Thus, FIG. 5C shows the code after operation 406 of FIG. 4.

Figure 5D:
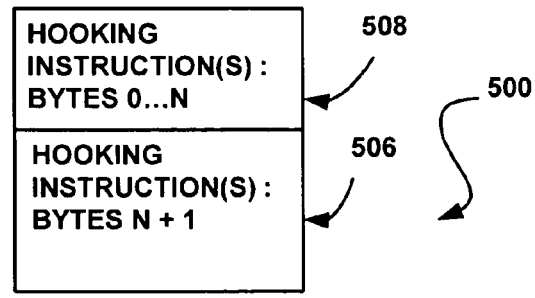

FIG. 5D shows the replacement of the holding instruction 504 with the initial portion of hooking code 508. Again, it should be noted that the holding instruction 504 (and the replacement hook code) is not drawn to scale in the present figure. With respect to FIG. 4, the code 500 is a result of operation 408 thereof.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems.

Thus, by optionally incorporating the present technology into the cyber-frameworks of the foregoing potential targets, terrorism may be countered by hooking an interface for security purposes, in the manner set forth hereinabove.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A hooking method, comprising:
inserting a holding instruction into interface code that has not yet been hooked by utilizing a processor; and
after inserting the holding instruction, completing the hooking of an interface; wherein the holding instruction holds operation of the interface such that there is a delay before the hooking of the interface is completed;
wherein the holding instruction holds any execution that arrives at the holding instruction for allowing the hooking of the interface to be completed without disruption;
wherein the holding instruction is inserted after a yield operation for allowing modified code which has already started execution to complete, such that disruption of the modified code in a form of a race condition where interference between a thread associated with the hooking of the interface and the modified code is avoided; wherein after the yield operation, the completion of the hooking is concluded by replacing the holding instruction with a second portion of hook code, the second portion of hook code inserted after a first portion of hook code to constitute an entirety of hook code to be inserted; and
wherein the holding instruction includes a relative jump instruction that operates to jump to a location of a jump instruction.

2. The method of claim 1, wherein the yield operation is performed.

3. The method of claim 2, wherein the hooking of the interface is completed, after the yield operation is performed.

4. The method of claim 2, wherein the yield operation includes a sleep instruction.

5. The method of claim 1, wherein the holding instruction is inserted with an atomic operation.

6. The method of claim 1, wherein it is determined whether the holding instruction would cross a memory boundary.

7. The method of claim 6, wherein the holding instruction is conditionally inserted based on the determination.

8. The method of claim 6, wherein the holding instruction is conditionally inserted past the memory boundary based on the determination.

9. The method of claim 6, wherein the memory boundary includes a cache memory boundary.

10. The method of claim 1, wherein the completing the hooking of the interface includes inserting the first portion of hook code after the holding instruction.

11. The method of claim 1, wherein the interface includes an application program interface (API).

12. The method of claim 1, wherein the interface is hooked for security purposes.

13. The method of claim 1, wherein the interface is hooked for countering terrorism.

14. The method of claim 1, wherein the holding instruction is inserted in a location where the hooking of the interface is to take place.

15. A hooking computer program product embodied on a computer readable memory, comprising:
   computer code for inserting a holding instruction into interface code that has not yet been hooked; and
   computer code for completing an operation, after inserting the holding instruction;
   wherein the holding instruction holds operation of an interface such that there is a delay before a hooking of the interface is completed;
   wherein the holding instruction holds any execution that arrives at the holding instruction for allowing the hooking of the interface to be completed without disruption;
   wherein the hooking computer program product is operable such that the holding instruction is inserted after a yield operation for allowing modified code which has already started execution to complete, such that disruption of the modified code in a form of a race condition where interference between a thread associated with the hooking of the interface and the modified code is avoided;
   wherein the hooking computer program product is operable such that after the yield operation, the completion of the hooking is concluded by replacing the holding instruction with a second portion of hook code, the second portion of hook code inserted after a first portion of hook code to constitute an entirety of hook code to be inserted; and
   wherein the holding instruction includes a relative jump instruction that operates to jump to a location of a jump instruction.

16. A system, comprising:
   a processor;
   a computer-executable holding instruction; and
   a computer-executable hooking application for completing a hooking of an interface utilizing the processor, after inserting the holding instruction;
   wherein the holding instruction holds operation of the interface such that there is a delay before the hooking of the interface is completed;
   wherein the system is operable such that the holding instruction is inserted into interface code that has not yet been hooked;
   wherein the holding instruction holds any execution that arrives at the holding instruction for allowing the hooking of the interface to be completed without disruption;
   wherein system is operable such that the holding instruction is inserted after a yield operation for allowing modified code which has already started execution to complete, such that disruption of the modified code in a form of a race condition where interference between a thread associated with the hooking of the interface and the modified code is avoided;
   wherein system is operable such that after the yield operation, the completion of the hooking is concluded by replacing the holding instruction with a second portion of hook code, the second portion of hook code inserted after a first portion of hook code to constitute an entirety of hook code to be inserted; and
   wherein the holding instruction includes a relative jump instruction that operates to jump to a location of a jump instruction.

* * * * *